United States Patent [19]

Tabares

[11] Patent Number: 4,522,365
[45] Date of Patent: Jun. 11, 1985

[54] DUAL-AXIS POSITIONING APPARATUS ADJUSTING THE ANGULAR POSITION OF AN OPTICAL ELEMENT

[75] Inventor: Gilbert Tabares, Playa del Rey, Calif.
[73] Assignee: Xerox Corporation, Stamford, Conn.
[21] Appl. No.: 467,638
[22] Filed: Feb. 18, 1983
[51] Int. Cl.³ .............................................. F16M 13/00
[52] U.S. Cl. .................................. 248/466; 248/184; 248/180; 308/2 A
[58] Field of Search ............... 248/466, 476, 487, 274, 248/180, 183, 184, 371; 269/60; 308/2 A

[56] References Cited

U.S. PATENT DOCUMENTS

| | | | |
|---|---|---|---|
| 3,407,018 | 10/1968 | Miller | 248/284 X |
| 3,424,413 | 1/1969 | Applegate | 350/288 X |
| 3,428,915 | 2/1969 | Leone et al. | 248/487 X |
| 3,436,050 | 4/1969 | Tibbals | 248/487 |
| 3,478,608 | 11/1969 | Met | 74/89.15 |
| 3,596,863 | 8/1971 | Kaspareck | 248/487 X |
| 3,700,313 | 10/1972 | Karr et al. | 350/288 |
| 3,897,139 | 7/1975 | Caruolo et al. | 248/477 X |
| 4,426,055 | 1/1984 | Reedy et al. | 248/184 |
| 4,442,524 | 4/1984 | Reeder et al. | 350/288 X |

Primary Examiner—William H. Schultz
Assistant Examiner—David M. Purol
Attorney, Agent, or Firm—Leonard Zalman

[57] ABSTRACT

A mount for a mirror of a laser resonator which will permit angular adjustment of the mirror with respect to two normal axes defining a plane at right angles to the axis of the laser resonator, while minimizing undesired mirror movement due to vibration and temperature variations. The mount, in the form of a flexure plate, is of unitary construction, comprised generally of a planar base plate member, two planar adjustment members, and connecting sections which couple the three planar members together. A first pair of the connecting sections rigidly link first and second oppositely disposed corner portions of the first adjustment member to the base plate member, and a second pair of the connecting sections rigidly link other oppositely disposed corner portions of the first adjustment member, generally disposed 90° relative to the first and second corner portions, to the second adjustment member. To achieve orientation of a mirror supported by the second adjustment member along one of the two normal axes, the corner portions of the first adjustment member lying intermediate the first pair of connecting sections are moved, such as by set screws or functionally equivalent devices, relative to the base plate member, and to achieve orientation of the mirror along the other of the two normal axes, the corner portions of the second adjustment member lying intermediate the second pair of connecting sections are moved relative to the base plate member.

2 Claims, 4 Drawing Figures

DUAL-AXIS POSITIONING APPARATUS ADJUSTING THE ANGULAR POSITION OF AN OPTICAL ELEMENT

BACKGROUND OF THE INVENTION

Mounts for the end mirrors of a laser resonator should be capable of a relatively wide range of non-interacting angular adjustments with respect to two normal axes which define a plane which extends at right angles to the optical axis of the laser resonator. Any such mount should be designed so that temperature variation and vibrations will not cause unwanted deviations in the angular positions of the mirrors.

Typical of previous laser mirror mounts is the mount shown in U.S. Pat. No. 3,700,313 to Karr et al. First and second plates are located adjacent one another and are hinged at one edge by a strip of spring metal. A third plate is hinged by spring metal to the second plate along a second edge displaced 90° to the first edge. A set of coaxial adjusting screws deflect the plates relative to each other about the spring metal hinges to effect spatial alingment of a laser mirror coupled to the first plate. In other approaches to mirror adjustment, coiled springs and multiple plate arrangements are utilized to achieve spatial alignment of the laser mirror.

BACKGROUND OF THE INVENTION

The present invention relates to a mount for a mirror of a laser resonator which will permit angular adjustment of the mirror with respect to two normal axes defining a plane at right angles to the axis of the laser resonator, while minimizing undesired mirror movement due to vibration and temperature variations. The novel mount, in the form of a flexure plate, is of unitary construction, comprised generally of a planar base plate member, which may be an integral part of the laser resonator, two planar adjustment members, and connecting sections which couple the three planar members together as set forth hereinafter. A first pair of connecting sections rigidly link first and second oppositely disposed corner portions of the first adjustment member to the base plate member, and a second pair of connecting sections rigidly link other oppositely disposed corner portions of the first adjustment member, generally disposed 90° relative to the first and second corner portions, to the second adjustment member. The base plate member and each adjustment member has a central core, aligned along the axis of the laser resonator, and the mirror is supported by the second adjustment member in a position along the axis of the laser resonator. To achieve orientation of the mirror along one of the two normal axes, the corner portions of the first adjustment member lying intermediate the first pair of connecting sections are moved, such as by set screws or functionally equivalent devices, relative to the base plate member, and to achieve orientation of the mirror along the other of the two normal axes, the corner portions of the second adjustment member lying intermediate the second pair of connecting sections are moved relative to the base plate member. Since the flexure plate mount is of a unitary, one piece construction, which can be a metal casting or an injection molded plastic, it is relatively insensitive to vibration and movement due to temperature variations, and hence the mirror will maintain its desired mounting angle or orientation in an environment subject to vibration and temperature variations.

DETAILED DESCRIPTION OF THE INVENTION

Figure 1:
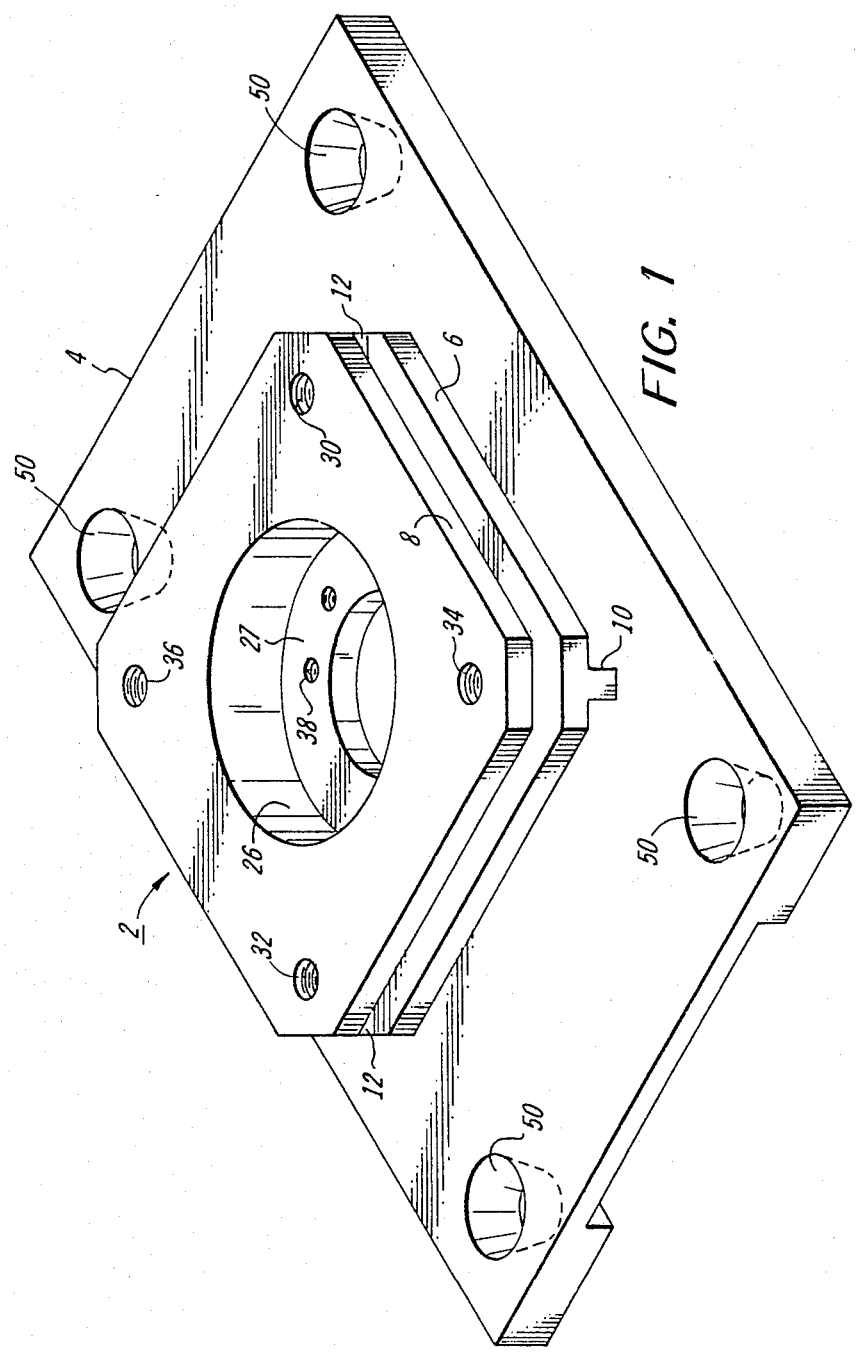
FIG. 1 is a perspective view of the dual-axis optical element positioning apparatus of the invention.
Figure 2:
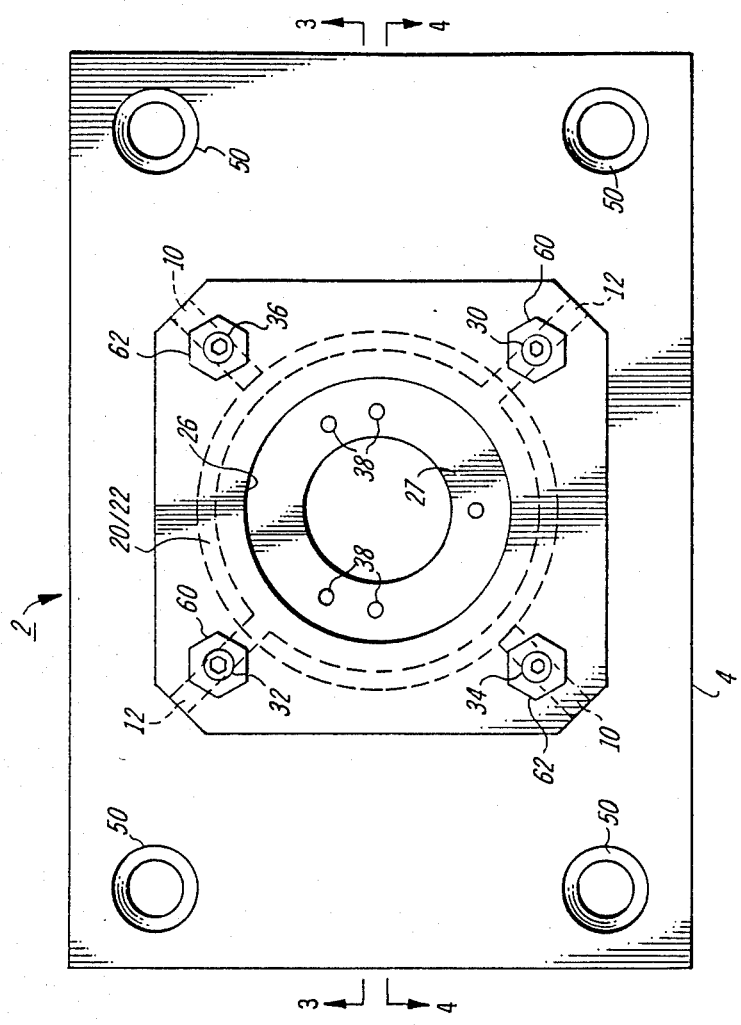
FIG. 2 is a top view of the positioning apparatus of FIG. 1.

Referring to the Figures, the optical element mounting and alignment device 2 of the invention includes a planar base plate member 4, a first planar angular adjustment member 6, and a second planar angular adjustment member 8. Adjustment member 6 is connected to base plate member 4 by connecting sections 10 located at a first pair of opposite corners of the adjustment member 6, and adjustment member 8 is connected to adjustment member 6 by connecting sections 12 located at a second pair of opposite corners of adjustment member 6. Base plate member 4 and adjustment member 6 have coaxial central aperatures 20 and 22, respectively, which may be of the same diameter. Adjustment member 8 also has a central aperature 24 defined by a central annulus 26 which is coaxial with aperatures 20 and 22. Inner portions of connecting sections 12 connect the annulus 26 of adjustment member 8 to the adjustment member 6. Base plate 4, adjustment members 6 and 8, connecting sections 10 and 12 and central annulus 26 form a unitary structure. Threaded apertures 30 and 32 extend transversely through portions of connecting sections 2 and the adjacent sections of both adjustment members 6 and 8, and threaded apertures 34 and 36 extend through portions of adjustment member 8 aligned with the connecting sections 10.

Figure 3:
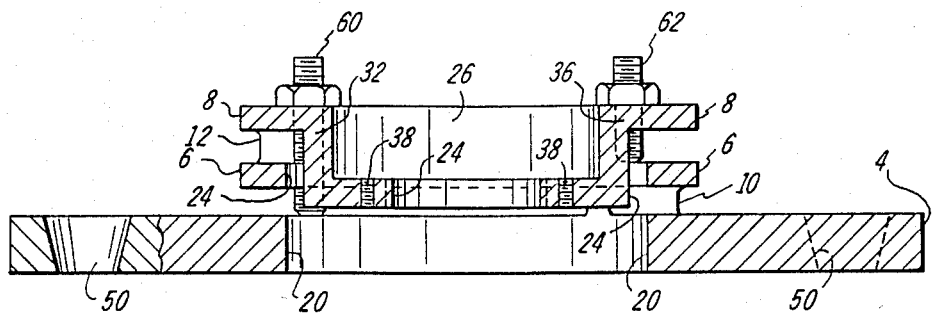
FIGS. 3 and 4 are sectional views of the positioning apparatus of FIG. 1.
Figure 4:
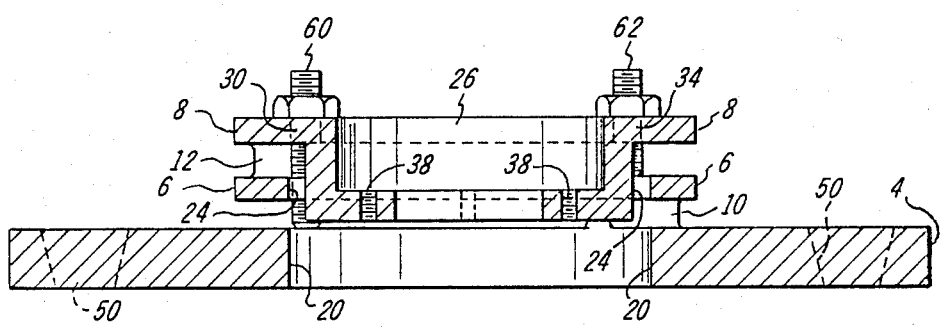

An optical element assembly (not shown), such as a laser mirror assembly, is mounted, in a conventional manner, within the annulus 26 by, for example, a plurality of screws (not shown) which traverse threaded holes 38 and clamp the optical element assembly against the ledge 27 of the annulus 26. Preparatory to providing angular adjustment of the optical element about the two axes of the nominal plane of the device 2, a pair of set screws 60 with lock nuts (or functionally equivalent fastening devices), having threaded body sections designed to mate with threaded apertures 30 and 32, are inserted into apertures 30 and 32 and journaled into those apertures until their contact with base plate member 4 (see FIG. 3) exerts an outward force on adjustment members 6 and 8, and a second pair of set screws 62 with lock nuts, having threaded body sections designed to mate with threaded apertures 34 and 36, are inserted into apertures 34 and 36 and journaled into those threaded apertures until their contact with adjustment member 6 (see FIG. 3) exerts an outward force on adjustment member 8. To provide angular adjustment of the optical element about one of the referenced axes, one or both of the fastening devices 60 associated with threaded apertures 30 and 32 is journaled in or out of the threaded apertures 30 and 32 which effectively rotates the angular adjustment members 6 and 8, and correspondingly the optical element, about the connecting sections 10. To provide angular adjustment of the optical element about the other of the referenced axes, one or both of the fastening devices 62 associated with threaded apertures 34 and 36 is journaled in and out of the threaded apertures 34 and 36 which effectively rotates the angular adjustment member 8, and correspondingly the optical element, about the connecting sections 12. Thus, the position of the optical element is adjusted about the plane of device 2, which adjustment, when the optical element is an end mirror of a laser resonator, will reflect light along the optical axis of the laser resonator.

As noted, the device 2 is of a unitary structure, that is, of one piece construction. Device 2 may be of a metal, such as cast steel or aluminum, or of a rigid plastic. Due to its unitary structure, device 2 is relatively insensitive to vibration. Also, its unitary structure assures that all of its components have the same coefficient of thermal expansion and hence temperature variations do not effect alignment as much as they would with the multi-compositional alignment devices now available.

Device 2 can be connected to, via chamfered holes 50, and form the end section of an optical assembly, such as a laser resonator, or it can be a component of a one-piece laser resonator. Tests of the device 2 as an end section of a laser resonator have shown that the device 2 extends laser life by 2-6 times relative to conventional mirror alignment devices.

I claim:

1. A positioning apparatus of unitary construction comprising first, second and third generally planar members with the second member between the first and third members, a first pair of rigid connecting sections rigidly linking first and second oppositely disposed portions of a first of said planar members to a second of said planar members, a second pair of rigid connecting sections rigidly linking other oppositely disposed portions of said first of said planar members to a third of said planar members, and means for moving portions of one of said planar members relative to the other of said planar members and for moving other portions of said one of said planar members relative to only one of said planar members.

2. A positioning apparatus of unitary construction for an optical element comprising a generally planar base member, a first generally planar adjustment member, and a second generally planar adjustment member, a first pair of connecting sections rigidly linking oppositely disposed portions of said first adjustment member to said base member, a second pair of connecting sections rigidly linking other oppositely disposed portions of said first adjustment member to said second adjustment member, a first pair of apertures extending through said first and second adjustment members and said pair of connecting sections, a second pair of apertures extending through said second adjustment member, said second pair of apertures being located adjacent said other portions of said first adjustment member, and means cooperating with said pairs of apertures for changing the planar orientation of said second adjustment member whereby changes can be made to the planar orientation of an optical element supported by said second adjustment member.

* * * * *